Figure 1:
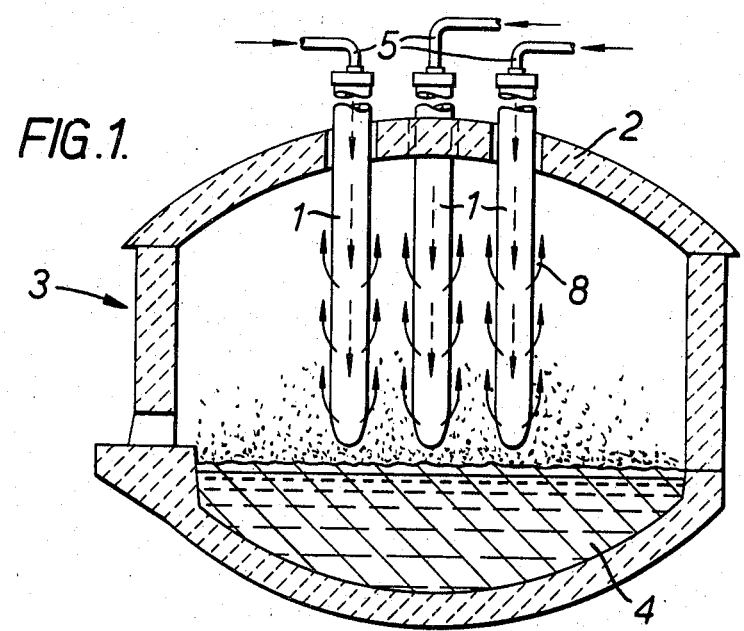

United States Patent [19]

Bowman

[11] 3,777,042
[45] Dec. 4, 1973

[54] ARC FURNACE ELECTRODES
[75] Inventor: Brian Bowman, Geneva, Switzerland
[73] Assignee: British Steel Corporation, London, England
[22] Filed: Oct. 4, 1972
[21] Appl. No.: 294,900

[30] Foreign Application Priority Data
Oct. 19, 1971 Great Britain.................. 48,594/71

[52] U.S. Cl. ................................................. 13/18
[51] Int. Cl. ............................................. H05b 7/06
[58] Field of Search ........................................ 13/18

[56] References Cited
UNITED STATES PATENTS
1,115,027  10/1914  Seabury ........................... 13/18 UX
3,471,626  10/1969  DeWeese et al. .................. 13/18 X
3,389,209  6/1968   DeCorso ............................... 13/18

Primary Examiner—Roy N. Envall, Jr.
Attorney—Leo A. Rosetta et al.

[57] ABSTRACT

A method of shrouding an electrode in an arc furnace by forcing nitrogen along a bore in the electrode, which is plugged at its tip, the gas diffusing through the electrode walls so as to create a protective shroud around its sides. The gas entrains along the bore a particulate carboniferous material which coagulates and fuses together and with the plug so as to constitute a growth in this plug along the bore and compensate for erosion of the electrode tip.

It is effective on both uncoated and coated electrodes - in the latter case, the gas will function to shroud only when this coating has been eroded, i.e., it serves as a secondary protective measure.

8 Claims, 2 Drawing Figures

PATENTED DEC 4 1973　　　　　　　　　　　　3,777,042

ARC FURNACE ELECTRODES

This invention relates to an arc furnace electrode and more particularly is concerned with increasing the life of the electrode within the harsh environment of an operating furnace.

The present invention consists in a method of shrouding an electrode in an arc furnace by forcing an inert gas along an axial bore in the electrode which is plugged at its tip, the gas diffusing through the electrode walls so as to create a protective shroud around its sides and entraining along the bore a particulate material which coagulates and fuses together with the plug, so as to constitute a growth in this plug along the bore and compensate for erosion of the electrode tip.

With a graphite or carbon electrode the plug and the particulate material may be carboniferous; the gas may conveniently be nitrogen. The electrode may or may not have a non-porous oxidation-resistant protective coating on its surface. If it has the gas will function to shroud only when this coating has been eroded, i.e., it serves as a secondary protective measure. In either case, the lifetime of the electrode will be extended compared with the case where this measure is not adopted.

In particular, it is known that oxidation of arc furnace electrodes amounts to between 45 percent and 50 percent of their overall consumption. The majority of this oxidation occurs at the side surfaces of the electrodes and is attributable to the free oxygen in the furance atmosphere. With the method according to this invention it is envisaged that the side loss rates will be reduced by up to 50 percent compared with an unprotected electrode, depending on size, the tip loss remaining substantially the same. This saving in electrode consumption far outweighs the increased cost in nitrogen consumption which, it is estimated, will be covered by a saving of only between 3 percent and 10 percent in side loss.

In order that the invention may be fully understood, one embodiment thereof will now be described, by way of example, with reference to the accompanying drawings in which:

FIG. 1 schematically illustrates a three-phase electric arc furnace; and

Figure 2:
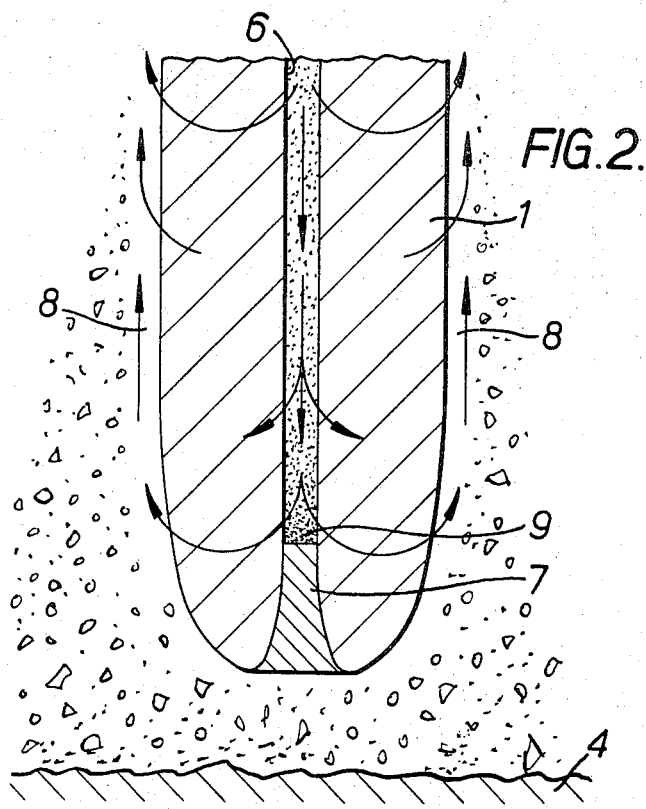

FIG. 2 illustrates a hollow plugged electrode through which nitrogen gas is forced in accordance with this invention.

Referring now to FIG. 1, carbon or graphite electrodes 1 extend through the roof 2 of an arc furnace generally indicated at 3 and housing a molten scrap charge 4. The electrodes are hollowed and are fed with nitrogen gas through piping 5.

In FIG. 2, one of the electrodes 1 is shown in more detail; in particular, the hollow bore 6 is terminated by a carboniferous plug 7.

In operation, as the electrodes 1 are lowered into the furnace nitrogen gas is forced through the piping 5. The gas passes along the bore 6 in each electrode and it diffuses through its sides, which are porous to this gas, so as to create a protective shroud 8 around the electrode, thus shielding it from the harsh environment in the furnace.

Since during operation the tip of the electrode is eroded as melting progresses, means must be provided for ensuring that the plug 7 at the tip remains intact, otherwise the density of the shroud is reduced and the electrode will be more susceptible to cracking. This is effected by entraining a particulate carboniferous material in the gas stream, e.g. carbon and pitch products, which particles coagulate and fuse together at the bottom of the bore adjacent the plug (shown at 9), thus building it up.

Consequently, as the electrode tip is eroded the plug is effectively built-up, preferably at the same rate it is eroded, thus maintaining stable conditions. In practice, however, some fluctuation in the gas flow rate is realised during operation, the rate dropping as the temperature increases due to increased gas viscosity.

Although this invention has been described with reference to the particular embodiment illustrated, it is to be understood that the scope of this invention is not so restricted. For example, the method according to this invention can be used with surface coated electrodes which normally function to extend the electrode life. In this instance, the protective shroud would not be manifested until the coating has been eroded, so that the use of nitrogen gas in this manner would serve only as a secondary measure of protection. Nonetheless, it is particularly advantageous since the coated electrodes are, in practice, subject to severe erosion not only as a result of the harsh atmosphere but by physical abrasion particularly by the slag on the surface of the molten charge.

We claim:

1. A method of shrouding an electrode in an arc furnace comprising the steps of forcing an inert gas along an axial bore in the electrode which is plugged at its tip, and introducing a particulate material into the gas stream, the gas diffusing through the electrode walls so as to create a protective shroud around its sides and entraining along the bore the particulate material which coagulates and fuses together with the plug, so as to constitute a growth in this plug along the bore and compensate for erosion of the electrode tip.

2. A method according to claim 1, in which the gas is nitrogen.

3. A method of shrouding a graphite or carbon electrode in an arc furnace comprising the step of blowing an inert gas along an axially extending bore in the electrode which is plugged at its tip with a carboniferous material, and introducing a carboniferous particulate material into the gas stream, the gas diffusing through the electrode walls so as to create a protective shroud around its sides and entraining along the bore the particulate material which coagulates and fuses together with the plug, so as to constitute a growth in this plug along the bore and compensate for erosion of the electrode tip.

4. A method according to claim 3, in which the electrode has a protective oxidation-resistant coating on its side walls, the gas diffusing through the electrode walls following the erosion of this surface coating in the furnace environment.

5. A method according to claim 4, in which the gas is nitrogen.

6. A graphite or carbon furnace electrode having an axial bore therethrough, and a plug of carboniferous material within said axial bore only at the tip end of the electrode closing said axial bore only at the electrode tip, said axial bore providing a passage for introducing an inert gas into the interior of the electrode, and said plug forming a stopper at the inner end of said passage.

7. A graphite or carbon furnace electrode according to claim 6 in which the side walls of the electrode are sufficiently porous to permit the passage therethrough of an inert gas.

8. A graphite or carbon furnace electrode according to claim 7 in which the outer side wall of the electrode is covered with a protective oxidation-resistant coating.

* * * * *